US012696248B2

(12) United States Patent
Bolotin et al.

(10) Patent No.: US 12,696,248 B2
(45) Date of Patent: Jul. 28, 2026

(54) TECHNIQUES TO AVOID INTER-SYMBOL INTERFERENCE DURING TCI STATE SWITCHING IN HIGH-SPEED TRAIN DEPLOYMENTS

(71) Applicant: Intel Corporation, Santa Clara, CA (US)

(72) Inventors: Ilya Bolotin, Santa Clara, CA (US); Andrey Chervyakov, Kildare (IE); Meng Zhang, Beijing (CN); Hua Li, Santa Clara, CA (US); Rui Huang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 18/560,313

(22) PCT Filed: Jan. 16, 2023

(86) PCT No.: PCT/US2023/010869
§ 371 (c)(1),
(2) Date: Nov. 10, 2023

(87) PCT Pub. No.: WO2023/137211
PCT Pub. Date: Jul. 20, 2023

(65) Prior Publication Data
US 2024/0236957 A1 Jul. 11, 2024

Related U.S. Application Data

(60) Provisional application No. 63/300,136, filed on Jan. 17, 2022.

(51) Int. Cl.
H04W 72/04 (2023.01)
H04W 72/0446 (2023.01)
H04W 72/231 (2023.01)

(52) U.S. Cl.
CPC ..... H04W 72/0446 (2013.01); H04W 72/231 (2023.01)

(58) Field of Classification Search
CPC ............. H04W 72/23; H04W 72/0446; H04W 72/232; H04W 72/231
See application file for complete search history.

(56) References Cited

U.S. PATENT DOCUMENTS 11,646,859 B2 * 5/2023 Zhang ................... H04L 5/1469
370/277
2020/0107352 A1 4/2020 Tsai et al.
(Continued)

FOREIGN PATENT DOCUMENTS

EP 3667943 A1 6/2020
WO WO-2019182806 A1 * 9/2019 ........... H04L 5/0096
(Continued)

OTHER PUBLICATIONS

International Patent Office—International Search Report and Written Opinion mailed May 11, 2023, from International Patent Application No. PCT/US2023/010869, 12 pages.
(Continued)

*Primary Examiner* — Shukri Taha
(74) *Attorney, Agent, or Firm* — Schwegman Lundberg & Woessner, P.A.

(57) ABSTRACT

Various embodiments herein provide techniques to avoid inter-symbol interference during transmission configuration indicator (TCI) state switching in high-speed train (HST) deployments. For example, a gap may be added between the validity of a first TCI state and a second TCI state when switching from the first TCI state to the second TCI state in a high speed scenario (e.g., power class 6). The techniques may be used for communication in New Radio (NR) frequency range 2 (FR2).

23 Claims, 9 Drawing Sheets

(56) References Cited

U.S. PATENT DOCUMENTS

| 2021/0092690 | A1 | | 3/2021 | Bergstrom et al. | |
| 2021/0111851 | A1 | * | 4/2021 | Lin | H04L 1/1812 |
| 2021/0378042 | A1 | * | 12/2021 | Cui | H04W 76/20 |
| 2022/0124782 | A1 | * | 4/2022 | Park | H04B 7/0404 |
| 2022/0200675 | A1 | * | 6/2022 | Raghavan | H04B 7/0695 |
| 2022/0361006 | A1 | * | 11/2022 | Xu | H04B 7/088 |

FOREIGN PATENT DOCUMENTS

| WO | WO-2022031546 A1 | * | 2/2022 | H04B 7/0696 |
| WO | WO-2023137211 A1 | | 7/2023 | |

OTHER PUBLICATIONS

3GPP, "Technical Specification Group Radio Access Network; NR; Requirements for support of radio resource management (Release 17)," 3GPP TS 38.133 V17.4.0 (Dec. 2021), 5G, 262 pages.
3GPP, "Technical Specification Group Radio Access Network; NR; Physical layer procedures for control (Release 17)," 3GPP TS 38.213 V17.0.0 (Dec. 2021), 5G, 225 pages.
"International Application Serial No. PCT/US2023/010869, International Preliminary Report on Patentability mailed Aug. 2, 2024", 9 pgs.

* cited by examiner

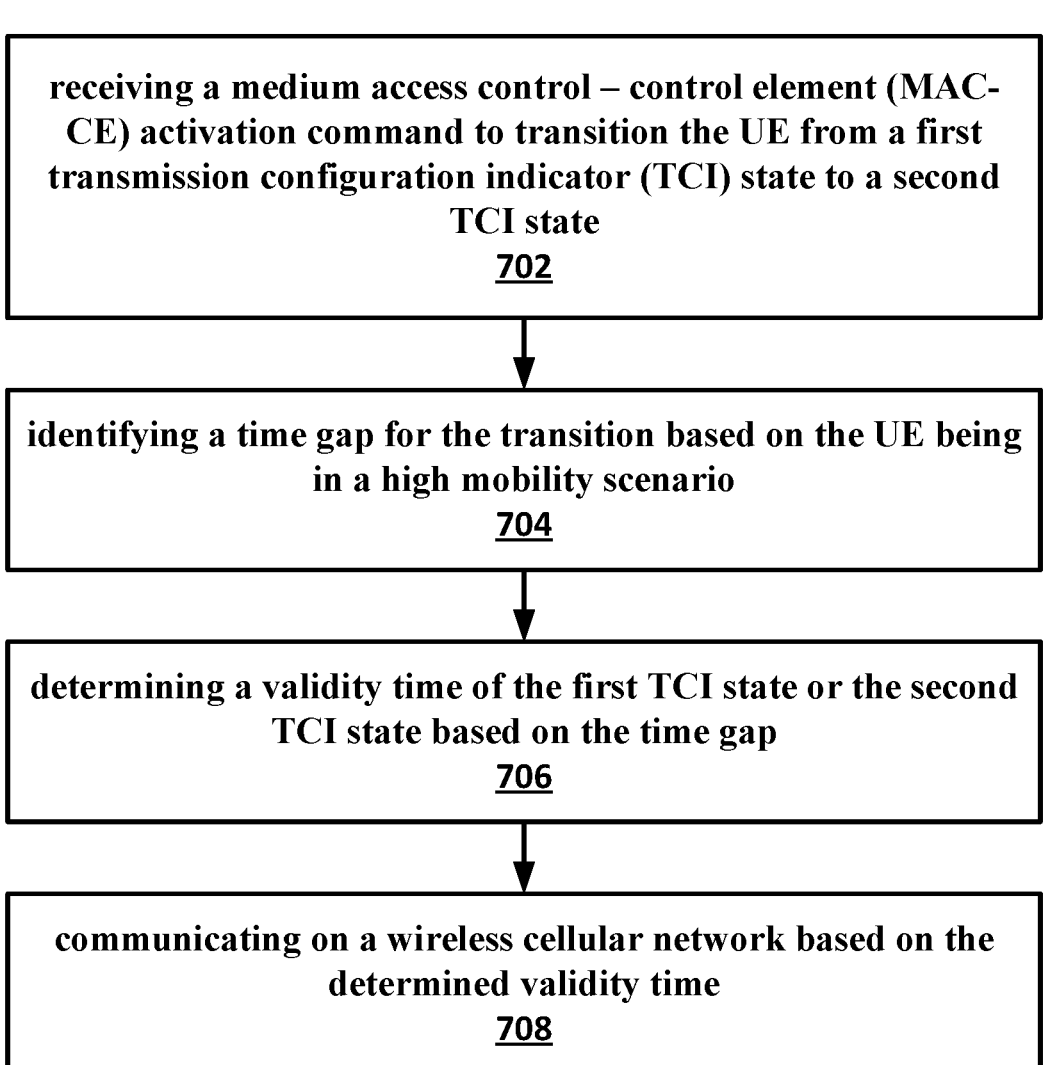

receiving a medium access control – control element (MAC-CE) activation command to transition the UE from a first transmission configuration indicator (TCI) state to a second TCI state
702 identifying a time gap for the transition based on the UE being in a high mobility scenario
704 determining a validity time of the first TCI state or the second TCI state based on the time gap
706 communicating on a wireless cellular network based on the determined validity time
708

Figure 7

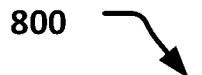

800

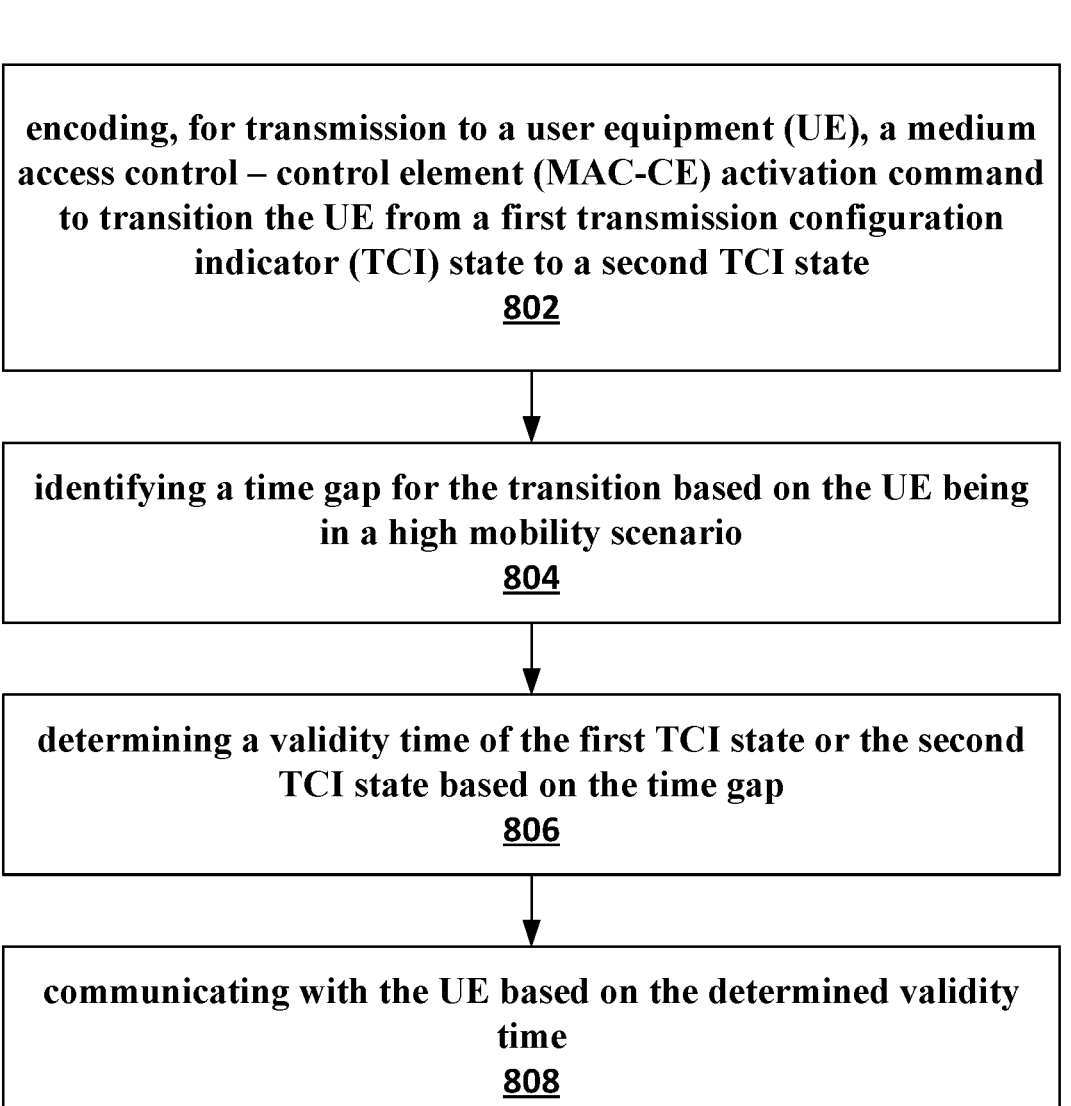

encoding, for transmission to a user equipment (UE), a medium access control – control element (MAC-CE) activation command to transition the UE from a first transmission configuration indicator (TCI) state to a second TCI state
802 identifying a time gap for the transition based on the UE being in a high mobility scenario
804 determining a validity time of the first TCI state or the second TCI state based on the time gap
806 communicating with the UE based on the determined validity time
808

Figure 8

900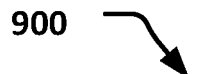

decoding a medium access control – control element (MAC-CE)
activation command to transition the UE from a first
transmission configuration indicator (TCI) state to a second TCI
state for communication on a frequency range 2 (FR2)
902 identifying a power class of the UE
904 determining, based on the power class, that a start time of the
second TCI state occurs after a time gap from an end time of the
second TCI state
906 monitoring for a physical downlink control channel (PDCCH)
with the second TCI state at the start time of the second TCI
state
908

Figure 9

TECHNIQUES TO AVOID INTER-SYMBOL INTERFERENCE DURING TCI STATE SWITCHING IN HIGH-SPEED TRAIN DEPLOYMENTS

CROSS REFERENCE TO RELATED APPLICATION

The present application is a national phase entry under 35 U.S.C. § 371 of International Application No. PCT/US2023/010869, filed Jan. 16, 2023, entitled "TECHNIQUES TO AVOID INTER-SYMBOL INTERFERENCE DURING TCI STATE SWITCHING IN HIGH-SPEED TRAIN DEPLOYMENTS," which claims priority to U.S. Provisional Patent Application No. 63/300,136, which was filed Jan. 17, 2022, the entire disclosures of which are hereby incorporated by reference.

FIELD

Various embodiments generally may relate to the field of wireless communications. For example, some embodiments may relate to techniques to avoid inter-symbol interference during transmission configuration indicator (TCI) state switching in high-speed train deployments.

BACKGROUND

A high-speed train (HST) scenario in a wireless cellular network involves a user equipment (UE) moving at a high rate of speed. The network may have multiple remote radio heads (RRHs) deployed along the route to service the UE. Such a network deployment and usage scenario provides many challenges.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 7, 8, and 9 illustrate example processes to practice the various embodiments herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques to avoid inter-symbol interference during transmission configuration indicator (TCI) state switching in high-speed train (HST) deployments. For example, embodiments may include adding a gap between the validity of a first TCI state and a second TCI state when switching from the first TCI state to the second TCI state in a high speed scenario (e.g., power class 6). In some embodiments, the techniques may be used for communication in New Radio (NR) frequency range 2 (FR2).

Figure 1:
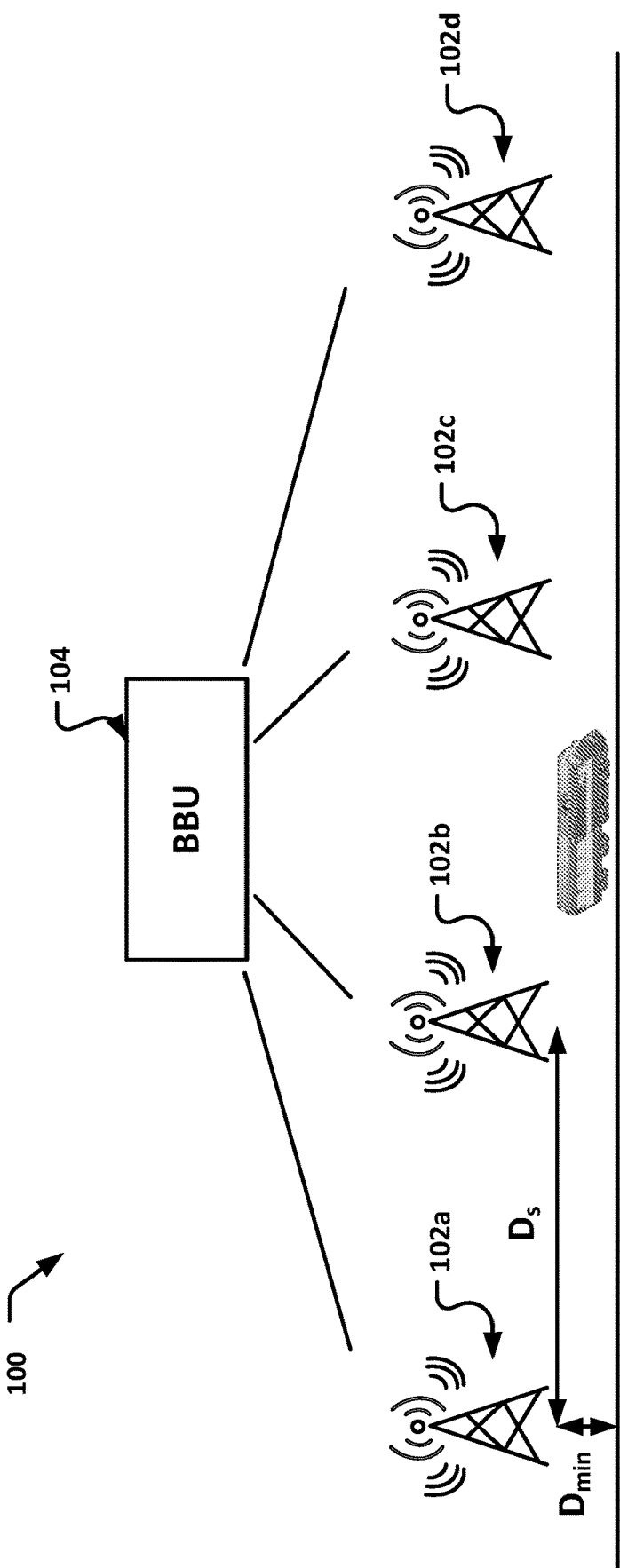
FIG. 1 illustrates a high-speed train (HST) deployment of a wireless cellular network, in accordance with various embodiments.

FIG. 1 illustrates an example HST deployment 100. The HST deployment 100 may include multiple remote radio heads (RRHs) 102a-d associated with a baseband unit (BBU) 104. The RRHs 102a-d may be related to one cell and may be located a certain distance from the railway and from each other. The dynamic power sharing (DPS) mode of operation is considered—the UE communicates with only one RRH at a time. Each RRH is mapped with its own set of SSBs. There are two main options on how service can be provided in such scenario: unidirectional or bidirectional deployment. In uni-directional deployment the RRHs are equipped with antenna arrays which are directed in one direction along the railway. In this case UE switches its serving RRH to or from (depending on the movement direction) the neighboring one when it passes it. Switching RRH within one cell is done through Active TCI state switching. The delay for Active TCI state switching is defined in 3GPP Technical Standard (TS) 38.133. In some cases, the propagation delay difference between the signals transmitted to UE from these RRHs can be larger than the TCI state switching delay, so the signals from neighboring RRHs can interfere each other. The techniques described herein may avoid such neighboring RRH signals overlapping.

Currently, in 3GPP TS38.133 V17.4.0, the requirements for active TCI state switching delay consider that the UE is able to receive PDCCH with the old TCI state until the switching to the new TCI state happens without any gap. These prior techniques did not consider deployments with distributed RRHs which result in big propagation delay difference for different TCI states.

In various embodiments herein, a gap may be added between the target TCI state and old TCI state transmissions to avoid inter-symbol interference. For example, a gap of one symbol or one slot may be applied either to new TCI state transmission delay, or to old TCI state transmission time limit.

The described embodiments may avoid DL performance degradation in FR2 HST deployments. The embodiments may change the measurement requirements in Rel-17 NR high speed scenario for FR2 in 3GPP TS 38.133.

Figure 2:
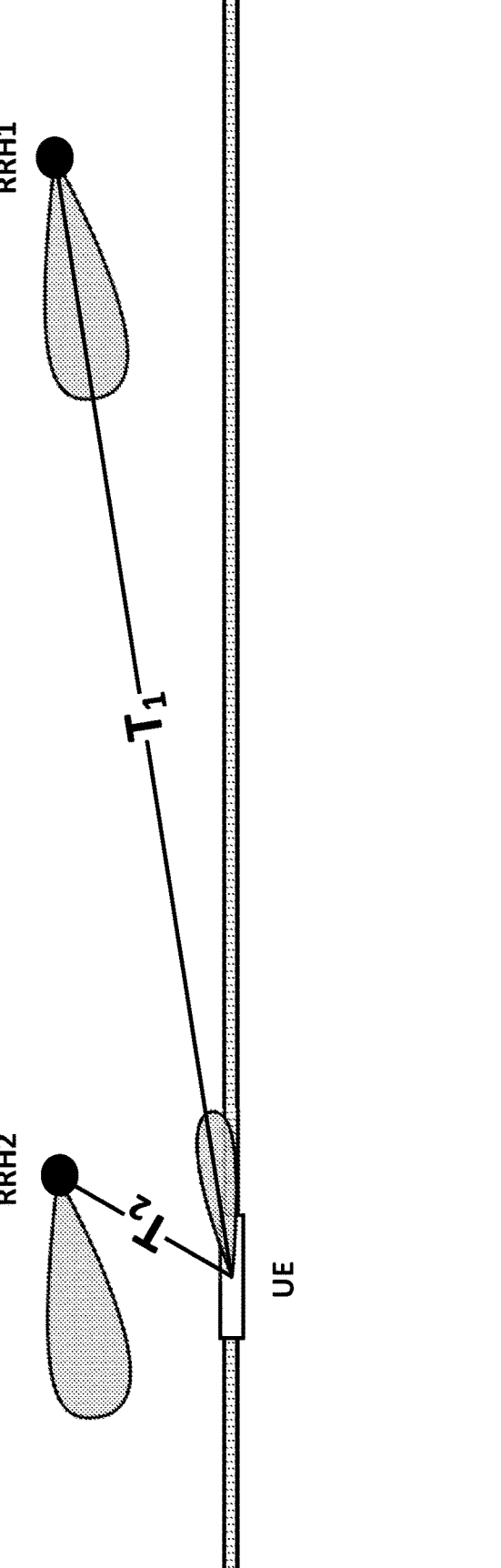
FIG. 2 illustrates transmission configuration indicator (TCI) state switching in a uni-directional deployment, in accordance with various embodiments.

As mentioned, in HST deployments several RRHs are connected to one gNB and spaced out along the railway track. As the UE moves, the UE switches its serving RRH which corresponds to switching active TCI state. In unidirectional deployment, at the moment of RRH switching large propagation delay jump larger than cyclic prefix (CP) length happens (see FIG. 2).

The 3GPP TS 38.133 V17.4.0, Section 8.10.3 specification defines the time limits for RRH1 (old TCI state) and RRH2 (target TCI state) transmissions as:

If the target TCI state is known, upon receiving PDSCH carrying MAC-CE activation command in slot n, UE shall be able to receive PDCCH with target TCI state of the serving cell on which TCI state switch occurs at the first slot that is after $$n + T_{HARQ} + 3N_{slot}^{subframe,\mu} + TO_k^*(T_{first-SSB} + T_{SSB-proc})/NR \text{ slot length.}$$

The UE shall be able to receive PDCCH with the old TCI state until $$n + T_{HARQ} + 3N_{slot}^{subframe,\mu}.$$

Where $T_{HARQ}$ is the timing between DL data transmission and acknowledgement as specified in TS 38.213 [3];

$T_{first-SSB}$ is time to first SSB transmission after MAC CE command is decoded by the UE; The SSB shall be the QCL-TypeA or QCL-TypeC to target TCI state $T_{SSB-proc}$=2 ms;

$TO_k$=1 if target TCI state is not in the active TCI state list for PDSCH, 0 otherwise.

Accordingly, for $TO_k$=0, there is no gap between old TCI state and target TCI state transmissions.

Figure 3:
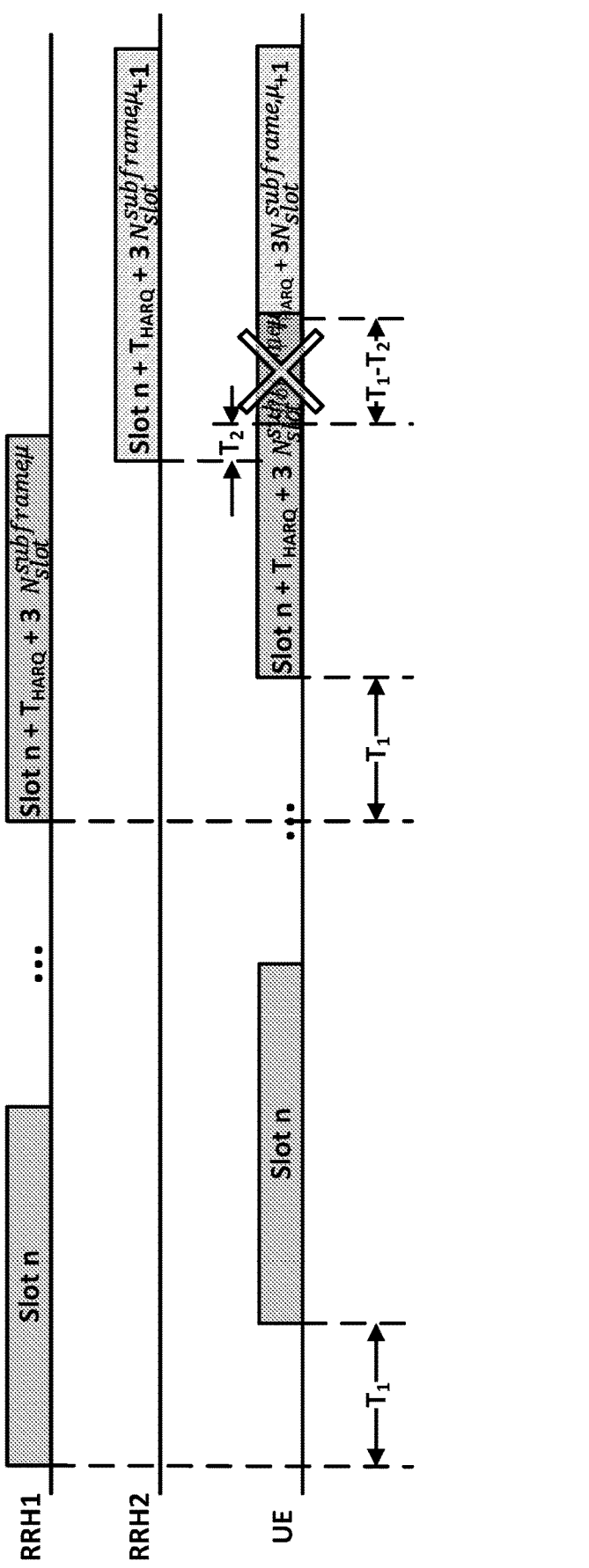
FIG. 3 illustrates an example of signals from a first remote radio head (RRH1) and a second remote radio head (RRH2) with different propagation delays, in accordance with various embodiments.

Since the signals from RRH1 and RRH2 have different propagation delays, they can overlap as it is shown in FIG. 3. In uni-directional deployment $(T_1 - T_2) > CP$ so inter-symbol interference will be observed.

To avoid that inter-symbol interference, a gap between old and new TCI state transmissions may be applied. Some specific, non-limiting examples of such a gap are described further below.

Applying Time Gap Between Old and New TCI State Transmissions at Active TCI State Switching in FR2 HST From 3GPP specification point of view this gap can be applied either to new TCI state transmission delay, or to old TCI state transmission time limit. Considering expected inter-RRH distances, the duration of one symbol should be enough for that gap. However, since the delays are defined in units of slots, gap of one slot can be used instead of gap of one symbol. The following options can be considered:

Option 1: One Symbol is Added to the Target TCI State Transmission Delay.

In some embodiments, a time gap of one symbol may be added to the target TCI state transmission delay. In one example, the text in 3GPP TS 38.133 (e.g., section 8.10.3) may be changed as follows:

If the target TCI state is known, upon receiving PDSCH carrying MAC-CE activation command in slot n, UE shall be able to receive PDCCH with target TCI state of the serving cell on which TCI state switch occurs at symbol #m of the first slot that is after $$n + T_{HARQ} + 3N_{slot}^{subframe,\mu} + TO_k^*(T_{first-SSB} + T_{SSB-proc})/NR$$

where m=1 for power class 6 and m=0 for other power classes. The UE shall be able to receive PDCCH with the old TCI state until $$\text{slot } n + T_{HARQ} + 3N_{slot}^{subframe,\mu}.$$

Where $T_{HARQ}$ is the timing between DL data transmission and acknowledgement as specified in TS 38.213 [3].

As used herein, $$N_{slot}^{subframe,\mu}$$

is a number of slots per subframe for numerology μ; $T_{first-SSB}$ is the time to first SSB transmission after MAC CE command is decoded by the UE; $T_{SSB-proc}$ is a SSB processing time (e.g., 2 ms); and $TO_k$=1 if the target TCI state is not in the active TCI state list for PDSCH, 0 otherwise.

Option 2: One Slot is Added to Target TCI State Transmission Delay.

In some embodiments, a time gap of one slot may be added to the target TCI state transmission delay. In one example, the text in 3GPP TS38.133 (e.g., section 8.10.3) can be changed as follows:

If the target TCI state is known, upon receiving PDSCH carrying MAC-CE activation command in slot n, UE shall be able to receive PDCCH with target TCI state of the serving cell on which TCI state switch occurs at the first slot that is after $$n + T_{HARQ} + 3N_{slot}^{subframe,\mu} + m + TO_k^*(T_{first-SSB} + T_{SSB-proc})/NR$$

where m=1 for power class 6 and m=0 for other power classes. The UE shall be able to receive PDCCH with the old TCI state until $$n + T_{HARQ} + 3N_{slot}^{subframe,\mu}.$$

Where $T_{HARQ}$ is the timing between DL data transmission and acknowledgement as specified in TS 38.213 [3];

Option 3: One Symbol is Subtracted from the Old TCI State Transmission Time Limit.

In some embodiments, a time gap of one symbol may be subtracted from the old TCI state transmission time limit. This may effectively end the validity of the prior TCI state one symbol earlier than otherwise (and provide a gap of one symbol before the validity of the target TCI state). In one example, the text in 3GPP TS 38.133 (e.g., section 8.10.3) can be changed as follows:

If the target TCI state is known, upon receiving PDSCH carrying MAC-CE activation command in slot n, UE shall be able to receive PDCCH with target TCI state of the serving cell on which TCI state switch occurs at the first slot that is after $$n + T_{HARQ} + 3N_{slot}^{subframe,\mu} + TO_k * (T_{first\text{-}SSB} + T_{SSB\text{-}proc})/NR$$

The UE shall be able to receive PDCCH with the old TCI state symbol #m of $$n + T_{HARQ} + 3N_{slot}^{subframe,\mu},$$

where m=12 for power class 6 and m=13 for other power classes. Where $T_{HARQ}$ is the timing between DL data transmission and acknowledgement as specified in TS 38.213 [3].

Systems and Implementations

Figure 4:
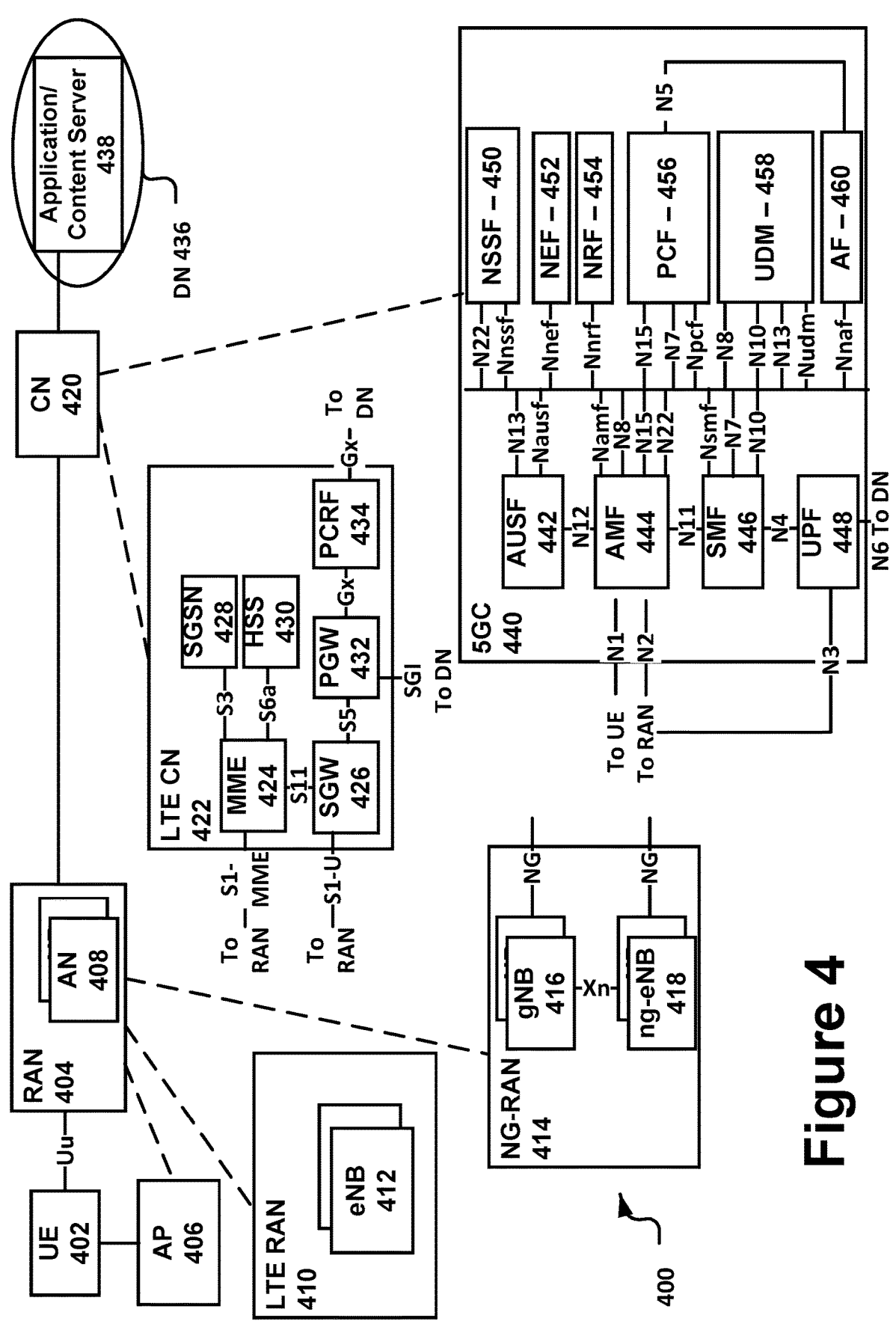
FIG. 4 schematically illustrates a wireless network in accordance with various embodiments.
Figure 5:
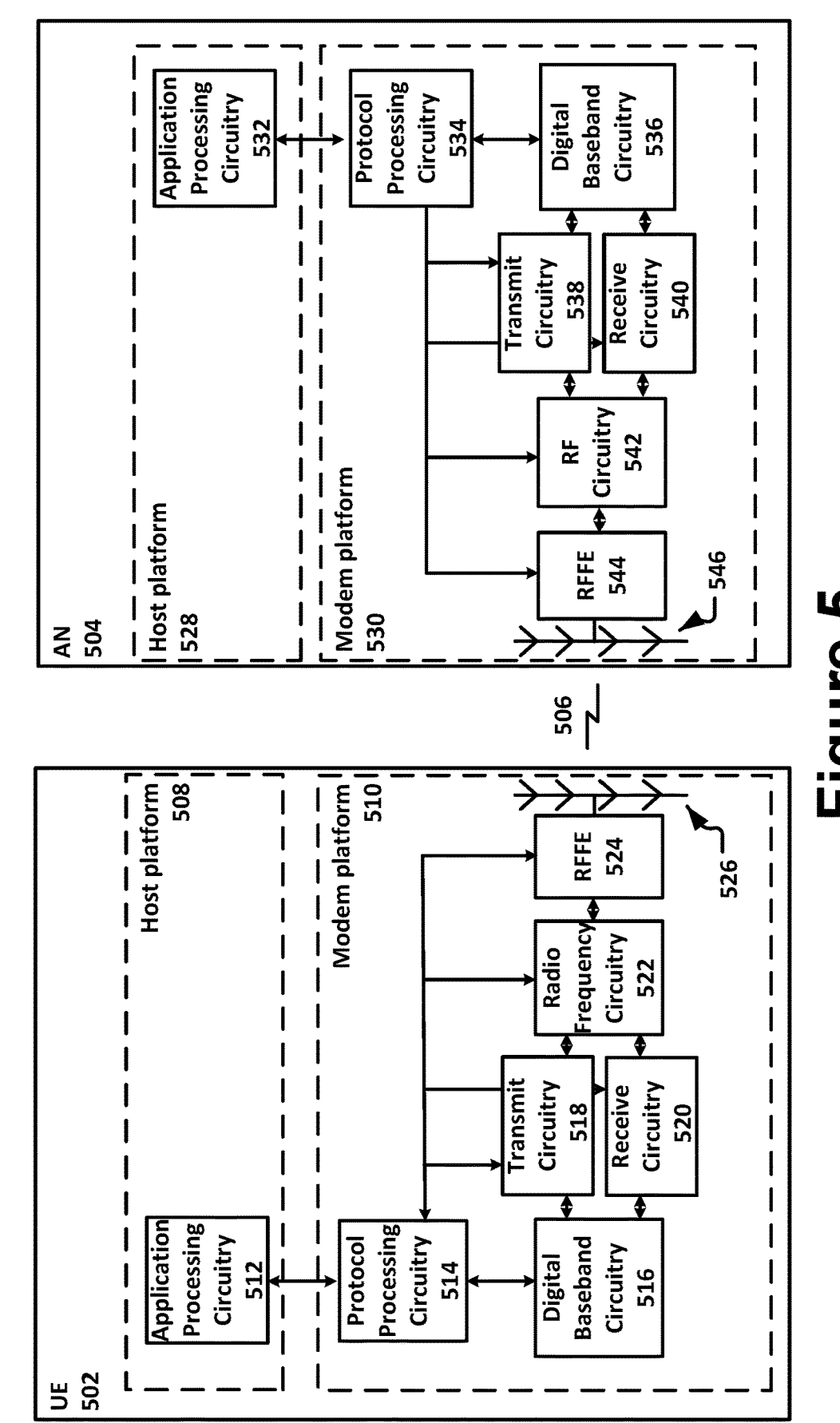
FIG. 5 schematically illustrates components of a wireless network in accordance with various embodiments.
Figure 6:
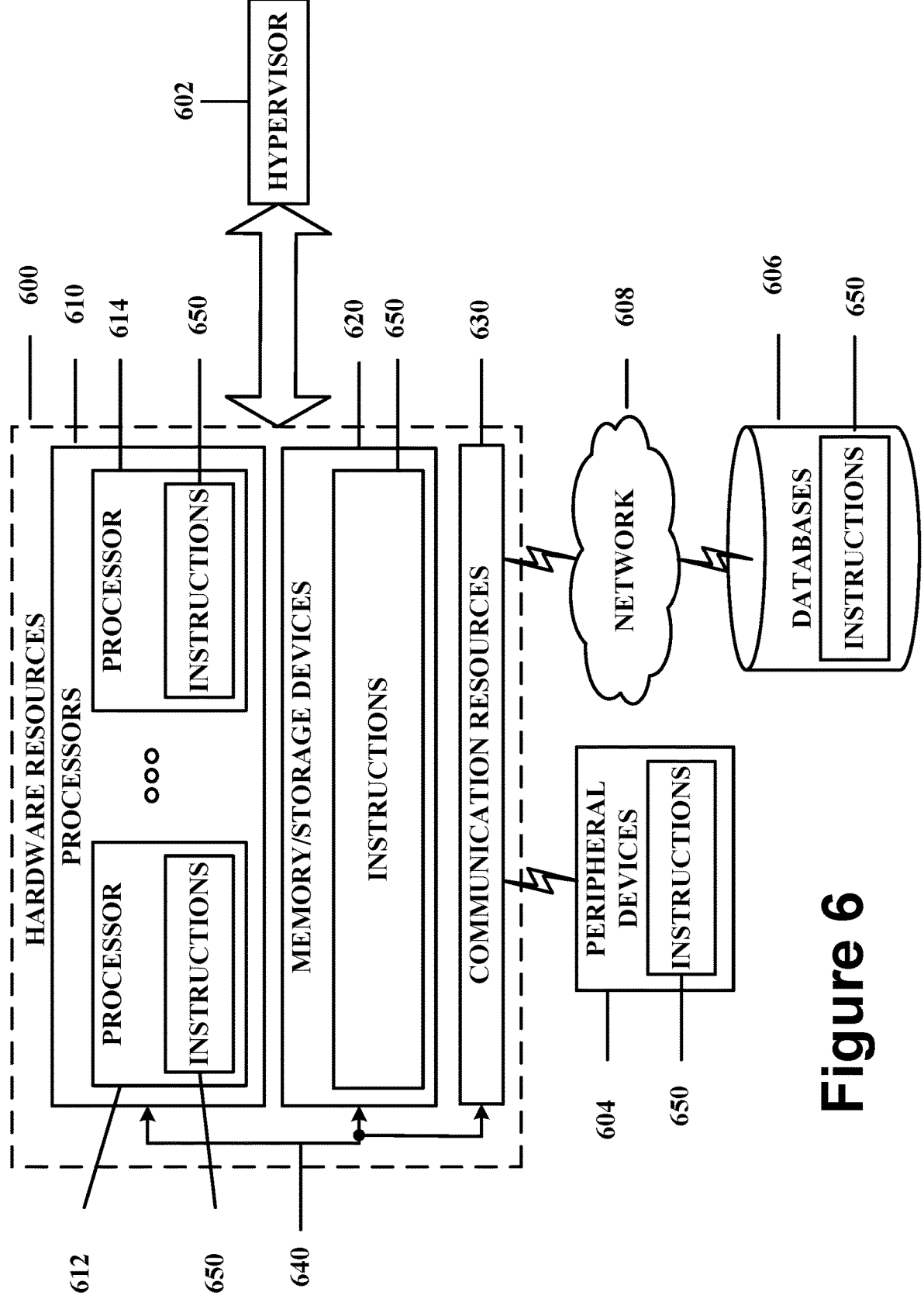
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 4-6 illustrate various systems, devices, and components that may implement aspects of disclosed embodiments.

FIG. 4 illustrates a network 400 in accordance with various embodiments. The network 400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 400 may include a UE 402, which may include any mobile or non-mobile computing device designed to communicate with a RAN 404 via an over-the-air connection. The UE 402 may be communicatively coupled with the RAN 404 by a Uu interface. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 402 may additionally communicate with an AP 406 via an over-the-air connection. The AP 406 may manage a WLAN connection, which may serve to offload some/all network traffic from the RAN 404. The connection between the UE 402 and the AP 406 may be consistent with any IEEE 802.11 protocol, wherein the AP 406 could be a wireless fidelity (Wi-Fi®) router. In some embodiments, the UE 402, RAN 404, and AP 406 may utilize cellular-WLAN aggregation (for example, LWA/LWIP). Cellular-WLAN aggregation may involve the UE 402 being configured by the RAN 404 to utilize both cellular radio resources and WLAN resources.

The RAN 404 may include one or more access nodes, for example, AN 408. AN 408 may terminate air-interface protocols for the UE 402 by providing access stratum protocols including RRC, PDCP, RLC, MAC, and LI protocols. In this manner, the AN 408 may enable data/voice connectivity between CN 420 and the UE 402. In some embodiments, the AN 408 may be implemented in a discrete device or as one or more software entities running on server computers as part of, for example, a virtual network, which may be referred to as a CRAN or virtual baseband unit pool. The AN 408 be referred to as a BS, gNB, RAN node, eNB, ng-eNB, NodeB, RSU, TRxP, TRP, etc. The AN 408 may be a macrocell base station or a low power base station for providing femtocells, picocells or other like cells having smaller coverage areas, smaller user capacity, or higher bandwidth compared to macrocells.

In embodiments in which the RAN 404 includes a plurality of ANs, they may be coupled with one another via an X2 interface (if the RAN 404 is an LTE RAN) or an Xn interface (if the RAN 404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 404 may each manage one or more cells, cell groups, component carriers, etc. to provide the UE 402 with an air interface for network access. The UE 402 may be simultaneously connected with a plurality of cells provided by the same or different ANs of the RAN 404. For example, the UE 402 and RAN 404 may use carrier aggregation to allow the UE 402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 402 or AN 408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 404 may be an LTE RAN 410 with eNBs, for example, eNB 412. The LTE RAN 410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 404 may be an NG-RAN 414 with gNBs, for example, gNB 416, or ng-eNBs, for example, ng-eNB 418. The gNB 416 may connect with 5G-enabled UEs using a 5G NR interface. The gNB 416 may connect with a 5G core through an NG interface, which may include an N2 interface or an N3 interface. The ng-eNB 418 may also connect with the 5G core through an NG interface, but may connect with a UE via an LTE air interface. The gNB 416 and the ng-eNB 418 may connect with each other over an Xn interface.

In some embodiments, the NG interface may be split into two parts, an NG user plane (NG-U) interface, which carries traffic data between the nodes of the NG-RAN 414 and a UPF 448 (e.g., N3 interface), and an NG control plane (NG-C) interface, which is a signaling interface between the nodes of the NG-RAN 414 and an AMF 444 (e.g., N2 interface).

The NG-RAN 414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 402 can be configured with multiple BWPs where each BWP configuration has a different SCS. When a BWP change is indicated to the UE 402, the SCS of the transmission is changed as well. Another use case example of BWP is related to power saving. In particular, multiple BWPs can be configured for the UE 402 with different amount of frequency resources (for example, PRBs) to support data transmission under different traffic loading scenarios. A BWP containing a smaller number of PRBs can be used for data transmission with small traffic load while allowing power saving at the UE 402 and in some cases at the gNB 416. A BWP containing a larger number of PRBs can be used for scenarios with higher traffic load.

The RAN 404 is communicatively coupled to CN 420 that includes network elements to provide various functions to support data and telecommunications services to customers/subscribers (for example, users of UE 402). The components of the CN 420 may be implemented in one physical node or separate physical nodes. In some embodiments, NFV may be utilized to virtualize any or all of the functions provided by the network elements of the CN 420 onto physical compute/storage resources in servers, switches, etc. A logical instantiation of the CN 420 may be referred to as a network slice, and a logical instantiation of a portion of the CN 420 may be referred to as a network sub-slice.

In some embodiments, the CN 420 may be an LTE CN 422, which may also be referred to as an EPC. The LTE CN 422 may include MME 424, SGW 426, SGSN 428, HSS 430, PGW 432, and PCRF 434 coupled with one another over interfaces (or "reference points") as shown. Functions of the elements of the LTE CN 422 may be briefly introduced as follows.

The MME 424 may implement mobility management functions to track a current location of the UE 402 to facilitate paging, bearer activation/deactivation, handovers, gateway selection, authentication, etc.

The SGW 426 may terminate an S1 interface toward the RAN and route data packets between the RAN and the LTE CN 422. The SGW 426 may be a local mobility anchor point for inter-RAN node handovers and also may provide an anchor for inter-3GPP mobility. Other responsibilities may include lawful intercept, charging, and some policy enforcement.

The SGSN 428 may track a location of the UE 402 and perform security functions and access control. In addition, the SGSN 428 may perform inter-EPC node signaling for mobility between different RAT networks; PDN and S-GW selection as specified by MME 424; MME selection for handovers; etc. The S3 reference point between the MME 424 and the SGSN 428 may enable user and bearer information exchange for inter-3GPP access network mobility in idle/active states.

The HSS 430 may include a database for network users, including subscription-related information to support the network entities' handling of communication sessions. The HSS 430 can provide support for routing/roaming, authentication, authorization, naming/addressing resolution, location dependencies, etc. An S6a reference point between the HSS 430 and the MME 424 may enable transfer of subscription and authentication data for authenticating/authorizing user access to the LTE CN 420.

The PGW 432 may terminate an SGi interface toward a data network (DN) 436 that may include an application/content server 438. The PGW 432 may route data packets between the LTE CN 422 and the data network 436. The PGW 432 may be coupled with the SGW 426 by an S5 reference point to facilitate user plane tunneling and tunnel management. The PGW 432 may further include a node for policy enforcement and charging data collection (for example, PCEF). Additionally, the SGi reference point between the PGW 432 and the data network 436 may be an operator external public, a private PDN, or an intra-operator packet data network, for example, for provision of IMS services. The PGW 432 may be coupled with a PCRF 434 via a Gx reference point.

The PCRF 434 is the policy and charging control element of the LTE CN 422. The PCRF 434 may be communicatively coupled to the app/content server 438 to determine appropriate QoS and charging parameters for service flows. The PCRF 432 may provision associated rules into a PCEF (via Gx reference point) with appropriate TFT and QCI.

In some embodiments, the CN 420 may be a 5GC 440. The 5GC 440 may include an AUSF 442, AMF 444, SMF 446, UPF 448, NSSF 450, NEF 452, NRF 454, PCF 456, UDM 458, and AF 460 coupled with one another over interfaces (or "reference points") as shown. Functions of the elements of the 5GC 440 may be briefly introduced as follows.

The AUSF 442 may store data for authentication of UE 402 and handle authentication-related functionality. The AUSF 442 may facilitate a common authentication framework for various access types. In addition to communicating with other elements of the 5GC 440 over reference points as shown, the AUSF 442 may exhibit an Nausf service-based interface.

The AMF 444 may allow other functions of the 5GC 440 to communicate with the UE 402 and the RAN 404 and to subscribe to notifications about mobility events with respect to the UE 402. The AMF 444 may be responsible for registration management (for example, for registering UE 402), connection management, reachability management, mobility management, lawful interception of AMF-related events, and access authentication and authorization. The AMF 444 may provide transport for SM messages between the UE 402 and the SMF 446, and act as a transparent proxy for routing SM messages. AMF 444 may also provide transport for SMS messages between UE 402 and an SMSF. AMF 444 may interact with the AUSF 442 and the UE 402 to perform various security anchor and context management functions. Furthermore, AMF 444 may be a termination point of a RAN CP interface, which may include or be an N2 reference point between the RAN 404 and the AMF 444; and the AMF 444 may be a termination point of NAS (N1) signaling, and perform NAS ciphering and integrity protection. AMF 444 may also support NAS signaling with the UE 402 over an N3 IWF interface.

The SMF 446 may be responsible for SM (for example, session establishment, tunnel management between UPF 448 and AN 408); UE IP address allocation and management (including optional authorization); selection and control of UP function; configuring traffic steering at UPF 448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 444 over N2 to AN 408; and determining SSC mode of a session. SM may refer to management of a PDU session, and a PDU session or "session" may refer to a PDU connectivity service that provides or enables the exchange of PDUs between the UE 402 and the data network 436.

The UPF 448 may act as an anchor point for intra-RAT and inter-RAT mobility, an external PDU session point of interconnect to data network 436, and a branching point to support multi-homed PDU session. The UPF 448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 448 may include an uplink classifier to support routing traffic flows to a data network.

The NSSF 450 may select a set of network slice instances serving the UE 402. The NSSF 450 may also determine allowed NSSAI and the mapping to the subscribed S-NS-SAIs, if needed. The NSSF 450 may also determine the AMF set to be used to serve the UE 402, or a list of candidate AMFs based on a suitable configuration and possibly by querying the NRF 454. The selection of a set of network slice instances for the UE 402 may be triggered by the AMF 444 with which the UE 402 is registered by interacting with the NSSF 450, which may lead to a change of AMF. The NSSF 450 may interact with the AMF 444 via an N22 reference point; and may communicate with another NSSF in a visited network via an N31 reference point (not shown). Additionally, the NSSF 450 may exhibit an Nnssf service-based interface.

The NEF 452 may securely expose services and capabilities provided by 3GPP network functions for third party, internal exposure/re-exposure, AFs (e.g., AF 460), edge computing or fog computing systems, etc. In such embodiments, the NEF 452 may authenticate, authorize, or throttle the AFs. NEF 452 may also translate information exchanged with the AF 460 and information exchanged with internal network functions. For example, the NEF 452 may translate between an AF-Service-Identifier and an internal 5GC information. NEF 452 may also receive information from other NFs based on exposed capabilities of other NFs. This information may be stored at the NEF 452 as structured data, or at a data storage NF using standardized interfaces. The stored information can then be re-exposed by the NEF 452 to other NFs and AFs, or used for other purposes such as analytics. Additionally, the NEF 452 may exhibit an Nnef service-based interface.

The NRF 454 may support service discovery functions, receive NF discovery requests from NF instances, and provide the information of the discovered NF instances to the NF instances. NRF 454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 454 may exhibit the Nnrf service-based interface.

The PCF 456 may provide policy rules to control plane functions to enforce them, and may also support unified policy framework to govern network behavior. The PCF 456 may also implement a front end to access subscription information relevant for policy decisions in a UDR of the UDM 458. In addition to communicating with functions over reference points as shown, the PCF 456 exhibit an Npcf service-based interface.

The UDM 458 may handle subscription-related information to support the network entities' handling of communication sessions, and may store subscription data of UE 402. For example, subscription data may be communicated via an N8 reference point between the UDM 458 and the AMF 444. The UDM 458 may include two parts, an application front end and a UDR. The UDR may store subscription data and policy data for the UDM 458 and the PCF 456, and/or structured data for exposure and application data (including PFDs for application detection, application request information for multiple UEs 402) for the NEF 452. The Nudr service-based interface may be exhibited by the UDR 221 to allow the UDM 458, PCF 456, and NEF 452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 458 may exhibit the Nudm service-based interface.

The AF 460 may provide application influence on traffic routing, provide access to NEF, and interact with the policy framework for policy control.

In some embodiments, the 5GC 440 may enable edge computing by selecting operator/3rd party services to be geographically close to a point that the UE 402 is attached to the network. This may reduce latency and load on the network. To provide edge-computing implementations, the 5GC 440 may select a UPF 448 close to the UE 402 and execute traffic steering from the UPF 448 to data network 436 via the N6 interface. This may be based on the UE subscription data, UE location, and information provided by the AF 460. In this way, the AF 460 may influence UPF (re)selection and traffic routing. Based on operator deployment, when AF 460 is considered to be a trusted entity, the network operator may permit AF 460 to interact directly with relevant NFs. Additionally, the AF 460 may exhibit an Naf service-based interface.

The data network 436 may represent various network operator services, Internet access, or third party services that may be provided by one or more servers including, for example, application/content server 438.

FIG. 5 schematically illustrates a wireless network 500 in accordance with various embodiments. The wireless network 500 may include a UE 502 in wireless communication with an AN 504. The UE 502 and AN 504 may be similar to, and substantially interchangeable with, like-named components described elsewhere herein.

The UE 502 may be communicatively coupled with the AN 504 via connection 506. The connection 506 is illustrated as an air interface to enable communicative coupling, and can be consistent with cellular communications protocols such as an LTE protocol or a 5G NR protocol operating at mm Wave or sub-6 GHZ frequencies.

The UE 502 may include a host platform 508 coupled with a modem platform 510. The host platform 508 may include application processing circuitry 512, which may be coupled with protocol processing circuitry 514 of the modem platform 510. The application processing circuitry 512 may run various applications for the UE 502 that source/sink application data. The application processing circuitry 512 may further implement one or more layer operations to transmit/receive application data to/from a data network. These layer operations may include transport (for example UDP) and Internet (for example, IP) operations The protocol processing circuitry 514 may implement one or more of layer operations to facilitate transmission or reception of data over the connection 506. The layer operations implemented by the protocol processing circuitry 514 may include, for example, MAC, RLC, PDCP, RRC and NAS operations.

The modem platform 510 may further include digital baseband circuitry 516 that may implement one or more layer operations that are "below" layer operations performed by the protocol processing circuitry 514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 510 may further include transmit circuitry 518, receive circuitry 520, RF circuitry 522, and RF front end (RFFE) 524, which may include or connect to one or more antenna panels 526. Briefly, the transmit circuitry 518 may include a digital-to-analog converter, mixer, intermediate frequency (IF) components, etc.; the receive circuitry 520 may include an analog-to-digital converter, mixer, IF components, etc.; the RF circuitry 522 may include a low-noise amplifier, a power amplifier, power tracking components, etc.; RFFE 524 may include filters (for example, surface/bulk acoustic wave filters), switches, antenna tuners, beamforming components (for example, phase-array antenna components), etc. The selection and arrangement of the components of the transmit circuitry 518, receive circuitry 520, RF circuitry 522, RFFE 524, and antenna panels 526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 514 may include one or more instances of control circuitry (not shown) to provide control functions for the transmit/receive components.

A UE reception may be established by and via the antenna panels 526, RFFE 524, RF circuitry 522, receive circuitry 520, digital baseband circuitry 516, and protocol processing circuitry 514. In some embodiments, the antenna panels 526 may receive a transmission from the AN 504 by receive-beamforming signals received by a plurality of antennas/antenna elements of the one or more antenna panels 526.

A UE transmission may be established by and via the protocol processing circuitry 514, digital baseband circuitry 516, transmit circuitry 518, RF circuitry 522, RFFE 524, and antenna panels 526. In some embodiments, the transmit components of the UE 504 may apply a spatial filter to the data to be transmitted to form a transmit beam emitted by the antenna elements of the antenna panels 526.

Similar to the UE 502, the AN 504 may include a host platform 528 coupled with a modem platform 530. The host platform 528 may include application processing circuitry 532 coupled with protocol processing circuitry 534 of the modem platform 530. The modem platform may further include digital baseband circuitry 536, transmit circuitry 538, receive circuitry 540, RF circuitry 542, RFFE circuitry 544, and antenna panels 546. The components of the AN 504 may be similar to and substantially interchangeable with like-named components of the UE 502. In addition to performing data transmission/reception as described above, the components of the AN 508 may perform various logical functions that include, for example, RNC functions such as radio bearer management, uplink and downlink dynamic radio resource management, and data packet scheduling.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640 or other interface circuitry. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processors 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 630 may include interconnection or network interface controllers, components, or other suitable devices to communicate with one or more peripheral devices 604 or one or more databases 606 or other network elements via a network 608. For example, the communication resources 630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Example Procedures

In some embodiments, the electronic device(s), network(s), system(s), chip(s) or component(s), or portions or implementations thereof, of FIGS. 4-6, or some other figure herein, may be configured to perform one or more processes, techniques, or methods as described herein, or portions thereof. One such process 700 is depicted in FIG. 7. The process 700 may be performed by a UE or a portion thereof. At 702, the process 700 may include receiving a medium access control-control element (MAC-CE) activation command to transition the UE from a first transmission configuration indicator (TCI) state to a second TCI state. At 704, the process 700 may further include identifying a time gap for the transition based on the UE being in a high mobility scenario. At 706, the process 700 may further include determining a validity time of the first TCI state or the second TCI state based on the time gap. At 708, the process may further include communicating on a wireless cellular network based on the determined validity time.

FIG. 8 illustrates another example process 800 in accordance with various embodiments. The process 800 may be performed by a gNB or a portion thereof. At 802, the process 800 may include encoding, for transmission to a user equipment (UE), a medium access control-control element (MAC-CE) activation command to transition the UE from a first transmission configuration indicator (TCI) state to a second TCI state. At 804, the process 800 may further include identifying a time gap for the transition based on the UE being in a high mobility scenario. At 806, the process 800 may further include determining a validity time of the first TCI state or the second TCI state based on the time gap. At 808, the process 800 may further include communicating with the UE based on the determined validity time.

FIG. 9 illustrates another example process 900 in accordance with various embodiments. At 902, the process 900 may include decoding a medium access control-control element (MAC-CE) activation command to transition the UE from a first transmission configuration indicator (TCI) state to a second TCI state for communication on a frequency range 2 (FR2). At 904, the process 900 may further include identifying a power class of the UE. At 906, the process 900 may further include determining, based on the power class, that a start time of the second TCI state occurs after a time gap from an end time of the second TCI state. At 908, the process 900 may further include monitoring for a physical downlink control channel (PDCCH) with the second TCI state at the start time of the second TCI state.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include one or more non-transitory computer-readable media (NTCRM) having instructions, stored thereon, that when executed by one or more processors of a user equipment (UE) configure the UE to: receive a medium access control-control element (MAC-CE) activation command to transition the UE from a first transmission configuration indicator (TCI) state to a second TCI state; identify a time gap for the transition based on the UE being in a high mobility scenario; determine a validity time of the first TCI state or the second TCI state based on the time gap; and communicate on a wireless cellular network based on the determined validity time.

Example 2 may include the one or more NTCRM of example 1 or some other example herein, wherein the time gap corresponds to one symbol added to a target TCI state transmission delay of the second TCI state.

Example 3 may include the one or more NTCRM of example 1 or some other example herein, wherein the time gap corresponds to one slot added to a target TCI state transmission delay of the second TCI state.

Example 4 may include the one or more NTCRM of example 1 or some other example herein, wherein the time gap corresponds to one symbol subtracted from a TCI state transmission time limit of the first TCI state.

Example 5 may include the one or more NTCRM of example 1 or some other example herein, wherein the first and second TCI states are associated with respective remote radio heads of a same cell.

Example 6 may include the one or more NTCRM of example 1 or some other example herein, wherein the first and second TCI states are associated with a 3GPP Frequency Range 2 (FR2).

Example 7 may include the one or more NTCRM of example 1 or some other example herein, wherein the high mobility scenario is associated with a power class 6.

Example 8 may include the one or more NTCRM of any one of examples 1-7 or some other example herein, wherein to communication on the wireless cellular network includes to decode a physical downlink control channel (PDCCH) with the second TCI state at the validity time of the second TCI state.

Example 9 may include one or more non-transitory computer-readable media (NTCRM) having instructions, stored thereon, that when executed by one or more processors of a next generation Node B (gNB) configure the gNB to: encode, for transmission to a user equipment (UE), a medium access control-control element (MAC-CE) activation command to transition the UE from a first transmission configuration indicator (TCI) state to a second TCI state; identify a time gap for the transition based on the UE being in a high mobility scenario; determine a validity time of the first TCI state or the second TCI state based on the time gap; and communicate with the UE based on the determined validity time.

Example 10 may include the one or more NTCRM of example 9 or some other example herein, wherein the time gap corresponds to one symbol added to a target TCI state transmission delay of the second TCI state.

Example 11 may include the one or more NTCRM of example 9 or some other example herein, wherein the time gap corresponds to one slot added to a target TCI state transmission delay of the second TCI state.

Example 12 may include the one or more NTCRM of example 9 or some other example herein, wherein the time gap corresponds to one symbol subtracted from a TCI state transmission time limit of the first TCI state.

Example 13 may include the one or more NTCRM of example 9 or some other example herein, wherein the first and second TCI states are associated with respective remote radio heads of a same cell.

Example 14 may include the one or more NTCRM of example 9 or some other example herein, wherein the first and second TCI states are associated with a 3GPP Frequency Range 2 (FR2).

Example 15 may include the one or more NTCRM of example 9 or some other example herein, wherein the high mobility scenario is associated with a power class 6.

Example 16 may include the one or more NTCRM of any one of examples 9-15 or some other example herein, wherein the MAC-CE is transmitted via a first remote radio head (RRH), and wherein the instructions, when executed, are further to configure the gNB to encode, for transmission to the UE via a second RRH, a physical downlink control channel (PDCCH) with the second TCI state based on the validity time of the second TCI state.

Example 17 may include one or more non-transitory computer-readable media (NTCRM) having instructions, stored thereon, that when executed by one or more processors of a user equipment (UE) configure the UE to: decode a medium access control-control element (MAC-CE) activation command to transition the UE from a first transmission configuration indicator (TCI) state to a second TCI state for communication on a frequency range 2 (FR2); identify a power class of the UE; determine, based on the power class, that a start time of the second TCI state occurs after a time gap from an end time of the second TCI state; and monitor for a physical downlink control channel (PDCCH) with the second TCI state at the start time of the second TCI state.

Example 18 may include the one or more NTCRM of example 17 or some other example herein, wherein the determination that the start time of the second TCI state occurs after the time gap from the end time of the second TCI state is further based on the second TCI state being in an active TCI state list for a physical downlink shared channel (PDSCH).

Example 19 may include the one or more NTCRM of example 17 or some other example herein, wherein the time gap is one symbol.

Example 20 may include the one or more NTCRM of example 19 or some other example herein, wherein the MAC-CE activation command is received in a slot n, and wherein the start time of the second TCI state occurs at symbol #m of a first slot that is after a $$n + T_{HARQ} + 3N_{slot}^{subframe,\mu} + TO_k * (T_{first\text{-}SSB} + T_{SSB\text{-}proc})/NR$$

slot length, wherein: m is the time gap; $T_{first\text{-}SSB}$ is a time to first synchronization signal block (SSB) transmission after the MAC-CE activation command is decoded by the UE; $T_{SSB\text{-}proc}$ is 2 milliseconds; and $TO_k=1$ if the second TCI state is not in the active TCI state list for PDSCH, and $TO_k=0$ otherwise.

Example 21 may include the one or more NTCRM of example 20 or some other example herein, wherein m=1 for the power class 6 and m=0 for other power classes.

Example 22 may include the one or more NTCRM of any one of examples 17-21 or some other example herein, wherein the first and second TCI states are associated with respective remote radio heads of a same cell.

Example 23 may include a method of applying time gap between old and new TCI state transmissions at Active TCI state switching in FR2 HST.

Example 24 may include the method of example 23 or some other example herein, where to apply a gap one symbol is added to target TCI state transmission delay with the following changes in section 8.10.3 of TS38.133:

If the target TCI state is known, upon receiving PDSCH carrying MAC-CE activation command in slot n, UE shall be able to receive PDCCH with target TCI state of the serving cell on which TCI state switch occurs at symbol #m of the first slot that is after $$n + T_{HARQ} + 3N_{slot}^{subframe,\mu} + TO_k * (T_{first\text{-}SSB} + T_{SSBproc})/NR$$

where m=1 for power class 6 and m=0 for other power classes. The UE shall be able to receive PDCCH with the old TCI state until $$n + T_{HARQ} + 3N_{slot}^{subframe,\mu}.$$

Where $T_{HARQ}$ is the timing between DL data transmission and acknowledgement as specified in TS 38.213 [3].

Example 25 may include the method of example 23 or some other example herein, where to apply a gap one slot is added to target TCI state transmission delay with the following changes in section 8.10.3 of TS38.133:

If the target TCI state is known, upon receiving PDSCH carrying MAC-CE activation command in slot n, UE shall be able to receive PDCCH with target TCI state of the serving cell on which TCI state switch occurs at the first slot that is after $$n + T_{HARQ} + 3N_{slot}^{subframe,\mu} + m + TO_k * (T_{first\text{-}SSB} + T_{SSB\text{-}proc})/NR$$

where m=1 for power class 6 and m=0 for other power classes. The UE shall be able to receive PDCCH with the old TCI state until $$n + T_{HARQ} + 3N_{slot}^{subframe,\mu}.$$

Where $T_{HARQ}$ is the timing between DL data transmission and acknowledgement as specified in TS 38.213 [3].

Example 26 may include the method of example 23 or some other example herein, where to apply a gap one symbol is a subtracted from the old TCI state transmission time limit with the following changes in section 8.10.3 of TS38.133:

If the target TCI state is known, upon receiving PDSCH carrying MAC-CE activation command in slot n, UE shall be able to receive PDCCH with target TCI state of the serving cell on which TCI state switch occurs at the first slot that is after $$n + T_{HARQ} + 3N_{slot}^{subframe,\mu} + TO_k * (T_{first\text{-}SSB} + T_{SSBproc})/NR$$

The UE shall be able to receive PDCCH with the old TCI state symbol #m of $$n + T_{HARQ} + 3N_{slot}^{subframe,\mu},$$

where m=12 for power class 6 and m=13 for other power classes. Where $T_{HARQ}$ is the timing between DL data transmission and acknowledgement as specified in TS 38.213 [3].

Example 27 may include a method comprising: determining a time gap for a transition from a first TCI state to a second TCI state for active TCI state switching in a high mobility scenario; and determining a validity time of the first TCI state and/or the second TCI state based on the time gap.

Example 28 may include the method of example 27 or some other example herein, wherein the high mobility scenario is a high-speed train (HST) scenario.

Example 29 may include the method of example 27-28 or some other example herein, wherein the first and second TCI states are associated with a 3GPP Frequency Range 2 (FR2).

Example Z01 may include an apparatus comprising means to perform one or more elements of a method described in or related to any of examples 1-29, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example Z03 may include an apparatus comprising logic, modules, or circuitry to perform one or more elements of a method described in or related to any of examples 1-29, or any other method or process described herein.

Example Z04 may include a method, technique, or process as described in or related to any of examples 1-29, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-29, or portions thereof.

Example Z06 may include a signal as described in or related to any of examples 1-29, or portions or parts thereof.

Example Z07 may include a datagram, packet, frame, segment, protocol data unit (PDU), or message as described in or related to any of examples 1-29, or portions or parts thereof, or otherwise described in the present disclosure.

Example Z08 may include a signal encoded with data as described in or related to any of examples 1-29, or portions or parts thereof, or otherwise described in the present disclosure.

Example Z09 may include a signal encoded with a datagram, packet, frame, segment, protocol data unit (PDU), or message as described in or related to any of examples 1-29, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-29, or portions thereof.

Example Z11 may include a computer program comprising instructions, wherein execution of the program by a processing element is to cause the processing element to carry out the method, techniques, or process as described in or related to any of examples 1-29, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |

-continued

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |

-continued

-continued

| | Abbreviations |
|---|---|
| | Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |

| | Abbreviations |
|---|---|
| | Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunnelling Protocol |
| GTP-UGPRS | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Reister |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Tranfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |

-continued | -continued

Abbreviations
Unless used differently herein, terms, definitions, and abbreviations may be
consistent with terms, definitions, and abbreviations defined in 3GPP TR
21.905 v16.0.0 (2019-06). For the purposes of the present document, the
following abbreviations may apply to the examples and embodiments
discussed herein.

| | |
|---|---|
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |

| | |
|---|---|
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |

-continued

Abbreviations
Unless used differently herein, terms, definitions, and abbreviations may be
consistent with terms, definitions, and abbreviations defined in 3GPP TR
21.905 v16.0.0 (2019-06). For the purposes of the present document, the
following abbreviations may apply to the examples and embodiments
discussed herein.

| | |
|---|---|
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |

-continued

Abbreviations
Unless used differently herein, terms, definitions, and abbreviations may be
consistent with terms, definitions, and abbreviations defined in 3GPP TR
21.905 v16.0.0 (2019-06). For the purposes of the present document, the
following abbreviations may apply to the examples and embodiments
discussed herein.

| | |
|---|---|
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |

27
-continued

Abbreviations
Unless used differently herein, terms, definitions, and abbreviations may be
consistent with terms, definitions, and abbreviations defined in 3GPP TR
21.905 v16.0.0 (2019-06). For the purposes of the present document, the
following abbreviations may apply to the examples and embodiments
discussed herein.

| | |
|---|---|
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |

28
-continued

Abbreviations
Unless used differently herein, terms, definitions, and abbreviations may be
consistent with terms, definitions, and abbreviations defined in 3GPP TR
21.905 v16.0.0 (2019-06). For the purposes of the present document, the
following abbreviations may apply to the examples and embodiments
discussed herein.

| | |
|---|---|
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |

-continued

30
-continued

| Abbreviations | |
|---|---|
| Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. | |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VOIP | Voice-over-IP, Voice-over-Internet Protocol |

| Abbreviations | |
|---|---|
| Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein. | |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators.

The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:

receive a medium access control-control element (MAC-CE) activation command to transition the UE from a first transmission configuration indicator (TCI) state to a second TCI state;

identify a time gap for the transition based on the UE being in a high mobility scenario;

determine a validity time of the first TCI state or the second TCI state based on the time gap; and communicate on a wireless cellular network based on the determined validity time, wherein the time gap corresponds to one symbol subtracted from a TCI state transmission time limit of the first TCI state.

2. The one or more NTCRM of claim 1, wherein the time gap corresponds to one symbol added to a target TCI state transmission delay of the second TCI state.

3. The one or more NTCRM of claim 1, wherein the time gap corresponds to one slot added to a target TCI state transmission delay of the second TCI state.

4. The one or more NTCRM of claim 1, wherein the first and second TCI states are associated with respective remote radio heads of a same cell.

5. The one or more NTCRM of claim 1, wherein the first and second TCI states are associated with a 3GPP Frequency Range 2 (FR2).

6. The one or more NTCRM of claim 1, wherein the high mobility scenario is associated with a power class 6.

7. The one or more NTCRM of claim 1, wherein to communicate on the wireless cellular network includes to decode a physical downlink control channel (PDCCH) with the second TCI state at the validity time of the second TCI state.

8. An apparatus of a user equipment (UE), the apparatus comprising:

a memory to store configuration information for a first transmission configuration indicator (TCI) state and a second TCI state; and processor circuitry, coupled to the memory, the processor circuitry to:

decode a medium access control-control element (MAC-CE) activation command to transition the UE from the first TCI state to the second TCI state for communication on a frequency range 2 (FR2);

identify a power class of the UE;

determine, based on the power class, that a start time of the second TCI state occurs after a time gap from an end time of the first TCI state; and monitor for a physical downlink control channel (PDCCH) with the second TCI state at the start time of the second TCI state.

9. The apparatus of claim 8, wherein the determination that the start time of the second TCI state occurs after the time gap from the end time of the first TCI state is further based on the second TCI state being in an active TCI state list for a physical downlink shared channel (PDSCH).

10. The apparatus of claim 8, wherein the time gap is one symbol.

11. The apparatus of claim 10, wherein the MAC-CE activation command is received in a slot n, and wherein the start time of the second TCI state occurs at symbol #m of a first slot that is after a slot $n+T_{HARQ}+3N_{slot}^{subframe,\mu}+TO_K*(T_{first-SSB}+T_{SSB-proc})/NR$ slot length, wherein:

m is the time gap;

$T_{first-SSB}$ is a time to first synchronization signal block (SSB) transmission after the MAC-CE activation command is decoded by the UE;

$T_{SSB-proc}$ is 2 milliseconds; and $TO_K=1$ if the second TCI state is not in an active TCI state list for PDSCH, and $TO_K=0$ otherwise.

12. The apparatus of claim 11, wherein m=1 for the power class 6 and m=0 for other power classes.

13. The apparatus of claim 8, wherein the first and second TCI states are associated with respective remote radio heads of a same cell.

14. A user equipment (UE) configured for operation in a fifth-generation new radio (5G NR) network, the UE comprising: processing circuitry and memory, wherein the processing circuitry is configured to:

decode a physical downlink shared channel (PDSCH) carrying a medium access control-control element (MAC-CE) received in an initial slot, the MAC-CE indicating a transmission configuration indicator (TCI) state switch for a serving cell to switch to a target TCI state for frequency range 2 (FR2) operation;

determine a target TCI state PDCCH reception slot for reception of a physical downlink control channel (PDCCH) with the target TCI state after reception of a PDCCH with a prior TCI state;

receive the PDCCH with the prior TCI state until a predetermined slot after the initial slot; and receive the PDCCH with the target TCI state in the target TCI state PDCCH reception slot, the target TCI state PDCCH reception slot occurring after the predetermined slot, wherein an amount of time between the predetermined slot and the target TCI state PDCCH reception slot is based on whether the UE is an FR2 power class 6 UE.

15. The UE of claim 14, wherein for the FR2 power class 6 UE when the target TCI state is in an active TCI state list and when the target TCI state is known:

the target TCI state PDCCH reception slot is a first slot after the predetermined slot and reception of the PDCCH with the target TCI state is to begin at symbol one in the first slot.

16. The UE of claim 15, wherein for the FR2 power class 6 UE when the target TCI state is not in the active TCI state list and when the target TCI state is known:

the target TCI state PDCCH reception slot is a second slot after the predetermined slot and reception of the PDCCH with the target TCI state is to begin at symbol zero in the second slot, the second slot occurring after the first slot.

17. The UE of claim 16, wherein the predetermined slot is after the initial slot by $$T_{HARQ}+3N_{slot}^{subframe,\mu},$$

where $T_{HARQ}$ is a timing between a downlink (DL) data transmission and an associated acknowledgement.

18. The UE of claim 16, wherein the FR2 power class 6 UE is configured for high-speed train (HST) deployment for communicating in in NR frequency range 2.

19. The UE of claim 14, wherein for the FR2 power class 6 UE when the target TCI state is in an active TCI state list and when the target TCI state is known:

the target TCI state PDCCH reception slot is a first slot immediately after the predetermined slot and reception of the PDCCH with the target TCI state is delayed by one symbol in the first slot.

20. The UE of claim 19, wherein for the FR2 power class 6 UE when the target TCI state is not in the active TCI state list and when the target TCI state is known:

the target TCI state PDCCH reception slot delayed to a second slot that is number slots after the predetermined slot and reception of the PDCCH with the target TCI state is to begin first symbol in the second slot.

21. The UE of claim 20, wherein the FR2 power class 6 UE is configured for high-speed train (HST) deployment for communicating in in NR frequency range 2.

22. The UE of claim 20, wherein the predetermined slot is after the initial slot by $$T_{HARQ} + 3N_{slot}^{subframe,\mu},$$

where $T_{HARQ}$ is a timing between a downlink (DL) data transmission and an associated acknowledgement.

23. The UE of claim 20, wherein the processing circuitry is configured to decode radio-resource control (RRC) signalling comprising an active TCI state list, and wherein the prior TCI state and the target TCI state are in FR2.

\* \* \* \* \*